United States Patent Office 3,584,077
Patented June 8, 1971

1

3,584,077
POLYMERIC COMPOSITIONS OF IMPROVED
DYEABILITY
Yukio Mizutani, Tokuyama-shi, Japan, assignor to
Tokuyama Soda Kabushiki Kaisha, Yamaguchi-ken,
Japan
No Drawing. Continuation-in-part of application Ser. No.
525,296, Feb. 7, 1966. This application July 23, 1968,
Ser. No. 746,751
Claims priority, application Japan, Feb. 9, 1965,
40/6,791; May 15, 1965, 40/28,204
Int. Cl. C08d 9/10; C08f 37/18
U.S. Cl. 260—873
10 Claims

ABSTRACT OF THE DISCLOSURE

A polymeric composition of improved dyeability and a process for preparing the same, wherein such polymeric composition comprises a difficultly dyeable polymer containing from 0.01% to 30% by weight of spheroidal particles of a diameter below 1 micron of a crosslinked copolymer of (1) an ethylenically unsaturated monomer containing a maleic anhydride unit and (2) based on the weight of (1) from 0.5% to 30% by weight of a diethylenically unsaturated vinyl monomer.

This application is a continuation-in-part of application Ser. No. 525,296, filed Feb. 7, 1966, now Pat. No. 3,423,481.

The present invention relates to compositions and shaped articles thereof of difficultly dyeable polymers, such as polyolefins, whose dyeability has been improved; and also to a process for preparing the same. More particularly, the present invention relates to polymeric compositions consisting of difficultly dyeable polymers in which have been incorporated in a uniformly dispersed state spheroical particles of a polymer of crosslinked structure having a maleic anhydride unit as a functional group capable of covalently bonding with a functional group of a dyestuff (hereinafter referred to as the reactive polymers).

It has been generally known to improve the dyeability of difficultly dyeable polymers by blending therewith a polymer having affinity for dyestuffs. However, although the dyeable polymer used in the foregoing method is a meltable linear polymer, it is not compatible with the difficultly dyeable polymer, with the consequence that a perfect polymer alloy is not formed between the two polymers, but the dyeable polymer is merely present in the difficulty dyeable polymers as particles which have coarsened. The reason for this is that when such a polymeric composition is submitted to a melting step of the molding or spinning operation, the dyeable polymer collects and fuses to become coarse because of the immiscibility, and hence a uniform dispersion cannot possibly be expected. When a non-homogeneously mixed polymeric composition such as this is spun, the dyeable polymer occupies nearly half of the filament, and as a result the yarn tenacity is reduced extremely and hence frequently becomes the cause of yarn breakage. On the other hand, when such a polymer blend is made into shaped articles, the dyeable polymer becomes progressively coarser on each occasion that it is subjected to a melting step, and this results in a tendency for spotty dyeing to occur.

In addition, since the foregoing dyeable polymer is usually readily soluble in various solvents, its elusion readily takes place upon its contact with such solvents. Hence, colorfast dyeing of such a fiber can not possibly be expected.

It has also been known to grind a cation exchange resin into fine particles of below 10 microns and adding this to the difficultly dyeable polymers such as polyolefins, e.g. Japanese patent application Publication No. 18,624/62. In this case, since the ion exchange resin used in one having a crosslinked structure, the phenomena such as coarsening of the dyeable polymer when melting the polymeric composition and the elusion of the dyeable polymer by means of solvents can be prevented. However, the cation exchange group in said resin is inferior as to its heat stability and partial heat decomposition occurs generally when 100° C., is exceeded to become the cause of undesirable discoloration. Again, there is the shortcoming that either due to the moisture that is entrained because of the hygroscopicity resulting from the cation exchange group or due to the decomposition gas evolving during the melt-molding operation, the transparency of the shaped polymer not only is not maintained but its tenacity also declines to a marked degree. In addition, the capacity of most of the cation exchange groups to bond with the dyestuffs is weak. For example, those dyed with the basic or disperse dyestuffs such as Brilliant Green GX (Colour Index No. C142040), Celliton Blue Extra (Colour Index No. C164500), etc., are decolored in practically all instances by means of organic solvents such as acetone. Thus, their colorfastness was not as yet satisfactory.

It is therefore an object of the present invention to impart level and fast dyeability to the shaped articles of difficultly dyeable polymers, without causing a decline in the physical properties of said shaped articles.

Another object of the present invention is to provide a polymeric composition of improved dyeability wherein the incorporated dyeable polymer particles do not collect and become coarse during the melt-molding of the polymeric composition but remain uniformly dispersed in the difficultly dyeable polymer, and which, in addition, possesses a high degree of heat stability even at the elevated temperatures of said melt-molding operation.

A still further object of the present invention is to provide a polymeric composition having great colorfastness as a result of the dyestuff molecules being firmly bonded by means of a covalent bond with the dyeable polymer particles dispersed in the difficultly dyeable polymer, during the dyeing of the shaped polymeric composition.

Another object of the present invention is to provide a method of improving the dyeability of difficultly dyeable polymers in which this improvement is capable of being carried out very easily without the need for any complicated operations.

Other objects and advantages of the present invention will become more apparent from the following description.

These objects of the present invention are achieved in accordance with this invention by a polymeric composition of improved dyeability which comprises a difficultly dyeable polymer wherein is contained in a uniformly dispersed state spheroidal particles of below one micron in diameter of a polymer having a functional group which does not decompose at the shaping temperature of said difficultly dyeable polymer, said functional group being a maleic anhydride unit, said polymer having the functional group of crosslinked structure.

The term "difficultly dyeable polymer," as used herein and the appended claims, refers to those polymers which do not exhibit affinity for dyestuffs; namely the polyolefins such as polyethylene and polypropylene, polyesters such as polyethylene terephthalate and polyethylene terephthalate-isopthalate, polyacrylonitrile, polyvinyl chloride, polyvinylidene chloride and the copolymers thereof; and the polymers whose affinity for dyestuffs is small such as polystyrene, polyacrylic acid esters, polymethacrylic acid esters and the styrene-acrylonitrile copolymer. When these difficultly dyeable polymers are dyed by means of the usual methods of dyeing, either they are not dyed at all, or even though they seemingly may be dyed, the dye is readily extracted with a detergent or solvent.

These difficultly dyeable polymers can, of course, contain in accordance with known prescriptions such additives as antioxidants, ultraviolet absorbants, delustrants, fillers and plasticizers.

According to this invention, with these difficultly dyeable polymers are blended spheroidal particles of a diameter of below one micron of a polymer having a maleic anhydride unit as a functional group which does not decompose at the shaping temperature of said difficultly dyeable polymers, the functional group being capable of covalently bonding with functional groups contained in dyestuffs and said group being of a crosslinked structure.

The maleic anhydride unit contained in the aforesaid spheroidal polymeric particles is one which reacts with such as the amino and hydroxyl etc., present in the dyestuff molecules to form an attachment of the nature of a covalent bond and is one which does not thermally decompose at the shaping temperature of the difficultly dyeable polymer.

For example, in the case of the difficultly dyeable polymers having a relative high melt-molding temperature, e.g. polyolefins such as polyethylene and polypropylene, polyesters such as polyethylene terephthalate, polyethers such as polyoxymethylene and vinylidene polymers such as polyvinylidene chloride, the polymeric particles having a maleic anhydride unit can be advantageously used. Similarly, in the case for example, of polystyrene and polyvinyl chloride or the difficultly dyeable polymers which can be formed by the wet molding means, e.g. polyacrylonitrile and polyvinyl chloride, polymeric particles having a maleic anhydride unit functional group can also be advantageously used.

It is believed that the following reactions take place between a maleic anhydride unit and the dyestuff molecule.

(1) 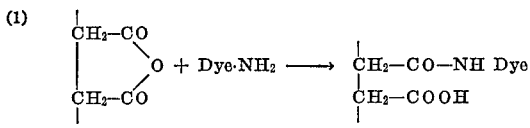

(2) 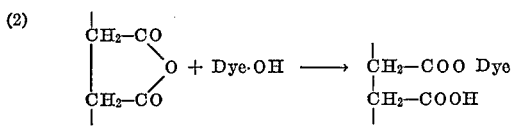

Hence, the dyestuff is firmly affixed chemically to the spheroidal particles which have been dispersed in the continuous phase of the difficultly dyeable polymer.

The polymeric spheroidal particles used in this invention have not only the foregoing functional group, but also have a crosslinked structure. It is necessary for the polymeric spheroidal particles to have this crosslinked structure in order to prevent the coarsening of the particles during the melting of the polymeric composition when molding or spinning it and also to prevent its elusion upon contacting a solvent.

According to this invention, any polymer can be used, provided it has as previously noted a specific functional group in accordance with the melt-molding temperature of the difficultly dyeable polymer used and the class of dye-stuff used, and in addition, has a net structure resulting from chemical crosslinking. The use, however, of the polymeric spheroidal particles having a particle diameter of the order of 0.01–1 micron, as prepared in accordance with the method described in my co-pending U.S. patent application Ser. No. 521,503, filed on Jan. 19, 1966, for "Process for Preparing Finely Divided High Polymers Having a Crosslinked Structure" is especially to be preferred.

According to this method, a vinyl monomer having a maleic anhydride unit as a functional group, e.g. maleic anhydride, and a diethylenically unsaturated vinyl monomer, e.g. divinyl compound as the crosslinking agent, and if desired, other ethylenically unsaturated vinyl monomers capable of radical polymerization with the foregoing compounds, e.g. styrene, acrylonitrile, acrylic acid esters, methacrylic acid esters, vinyl chloride and vinyl acetate, are submitted to radical polymerization in an organic solvent, e.g. an aliphatic or aromatic hydrocarbon or aliphatic alcohol which has the property that it dissolves said monomeric system, but does not dissolve the straight-chain polymer consisting of these monovinyl compounds.

It is possible in accordance with the foregoing method to obtain directly polymeric spheroidal particles having a uniform particle size of the order of a particle diameter 0.01–1 micron and which moreover have a crosslinked structure. It is not desirable for the size of the reactive polymeric particles to exceed one micron, since this results in a decline in the transparency and physical properties of the shaped articles or causes such troubles as the clogging of the spinning nozzle or yarn breakage.

The reactive polymer most suited for the purpose of this invention contains the aforesaid divinyl compound in an amount, based on the vinyl monomer, of at least 0.5% by weight, and preferably 0.5 to 30% by weight, and the aforesaid functional group-containing vinyl compound in an amount, based on the whole of the vinyl monomer, of at least 10 mol percent. When the divinyl compound is used in an amount, based on the vinyl monomer, of less than 0.5% by weight, there is a tendency for the size of the polymeric spheroidal particles to exceed one micron. And it is undesirable since there occurs a slight tendency to melting or to dissolving in solvents. On the other hand, when the molar ratio of the vinyl monomer having the reactive functional group becomes less than 10 mol percent, a great amount of the reactive polymeric particles must be blended for improving the dyeability, and this is undesirable for this results in a decline in the transparency and physical properties of the shaped articles.

Typical of the reactive polymers suitable in this invention include the polymers containing maleic anhydride unit such as maleic anhydride/divinylbenzene, maleic anhydride/styrene/divinylbenzene and maleic anhydride/acrylonitrile/divinylbenzene.

In the present invention, it is possible to use the finely divided polymer obtained by the method hereinbefore described in which the maleic anhydride unit has been modified with an amino group by being reacted with an amino compound. In this case, the shaped articles exhibited improved dyeability by means of the acid dyes which were hitherto considered to be unsuitable for dyeing polyolefins. For this purpose, the amino compound can be chosen from aromatic or aliphatic mono and polyamino compounds such as lower alkyl primary aliphatic monoamines, e.g. ethylamine, propylamine, t-butylamine; secondary aliphatic monoamines, e.g. diethyl amine, di-t-butylamine, substituted aliphatic primary monoamines, e.g. ethanolamine; alkylene polyamines, e.g. ethylene diamine, diethylene triamine, tetraethylene pentamine; and aromatic mono and polyamines, e.g. aniline, phenylene diamine and aminophenol. Such amino compounds, of course, can be used singly or in any combination of two or more.

In improving the dyeability of the difficultly dyeable polymers, the critical feature of this invention resides in the use of spheroidal particles of a diameter below one micron of a polymer having a crosslinked structure and containing a maleic anhydride unit as a functional group which does not decompose at the shaping temperature of the difficultly dyeable polymer and which can form a covalent bond with functional groups of dyestuffs. The reason therefor is as follows. According to the concepts of the prior art, it was considered that the polymer to be added for improving the dyeability of the difficultly dyeable polymer could be any polymer so long as it had an affinity for the dyestuff. Thus, the concept, as in this invention, which holds that the polymer to be added must be one in which not only its physical configuration but also whose functional group must be fully stable thermally at the shaping temperature of the difficultly dyeable polymer and furthermore, that the chemical structure of the functional group must be such that it is capable of forming a covalent bond with the functional group present in the dyestuff molecule, did not exist at all.

According to this invention, particles of a polymer having a specified functional group and having a crosslinked structure are used in accordance with the shaping temperature of the difficultly dyeable polymer used for this purpose and the class of the dyestuff used. Furthermore, it is specified that the polymeric particles must be spheroidal and of a particle diameter below one micron for facilitating the uniform dispersion of such polymer particles in the difficultly dyeable polymer and for facilitating the operation of molding the composition.

In addition, when the finely divided polymer obtained by the method of the aforesaid co-pending application is used, the dispersion in the difficultly dyeable polymer can be accomplished very readily, because there is no tendency to flocculation between the particles as they do not have any impurities on their surface, such as the emulsifying agent.

Hence, the particles of the foregoing reactive polymer are contained uniformly dispersed in the continuous phase of the difficultly dyeable polymer in the invention polymeric composition.

The polymeric particles contained in the polymeric composition of the present invention can be varied in a range between 0.1% and 30%. At a content of less than 0.1%, fully satisfactory dyeing effects are unobtainable, whereas an addition of a large amount in excess of 30% causes a decline in the transparency and tenacity of the polymeric composition. Hence, the preferred range is between 0.1% and 10%, and particularly between 1% and 5%. Especially, in the case of polymers to be used for spinning, the addition of large amounts is undesirable.

For carrying out the addition and mixing of the aforesaid finely divided reactive polymer in the difficultly dyeable polymer, the known means of blending pigments, fillers, etc., in polymers can be employed without any change. As to the time at which the reactive polymer is mixed with the difficultly dyeable polymer, this also may be at any time as long as it is before the shaping operation. For illustrative purposes, typical methods of carrying out the mixing operation are described below.

(a) Methods of mixing the reactive polymer directly with the difficultly dyeable polymer.

There is a method of mixing the finely divided reactive polymer, as such, mechanically with the difficultly dyeable polymer which is in a form of either a powder, flakes or chips; or a method of accomplishing the mixing mechanically by using a solvent and forming a slurry first; or a method of mixing the finely divided reactive polymer into a solution or dispersion of the difficultly dyeable polymer, or the polymer in its molten state. In these instances, use can be made of a mixing tank, an extruder, a Banbury mixer or other types of mixers.

(b) A method of carrying out the polymerization in the presence of a difficultly dyeable polymer.

In preparing the finely divided reactive polymer by polymerizing the aforesaid vinyl compound in an organic solvent, the reaction is carried out in the presence in said solvent of a powder of a difficultly dyeabe polymer. In this case, there is the advantage that the formation of the finely divided reactive polymer and the homogeneous mixing therewith of the difficultly dyeable polymer is accomplished concurrently.

In mixing the finely divided reactive polymer into a difficultly dyeable polymer, regardless of the mixing method used, it is preferable that a dispersing assistant, as usually used during the addition of a powdered substance, be used, such as e.g. calcium stearate, stearic acid and stearylamine.

The so obtained polymeric composition of this invention can be melt-spun or wet-spun by procedures known in the art and made into filaments or staples. Further, this polymeric composition can be made into shaped articles such as films, sheets, pipes, etc., by such means as melt-extrusion, blow molding and casting of the polymer solution.

The shaped articles composed of the invention composition, such as fibers and films, are readily dyed by a wide range of dyestuffs such as disperse, basic and acid dyes. Furthermore, since such dyes are chemically bonded to the reactive polymeric particles which have been uniformly dispersed in the composition, the colorfastness is exceedingly good, and it is hardly decolored even with cleaning solvents such as perchloroethylene.

The invention is further illustrated by means of the following examples, which are for illustrative purpose and not in limitation of the invention in any sense. All percentages and parts are on a weight basis, unless otherwise noted.

EXAMPLE I

Thirty-two grams of styrene, 3.5 grams of divinyl benzene, 5 grams of maleic anhydride and 0.1 gram of benzoyl peroxide were heated to a temperature of 75–80° C., with stirring in 100 cc. of kerosene, and 25 grams of finely divided polymeric particles (particles size being not more than 0.1 micron) were obtained. Four parts of these particles and 96 parts of polypropylene powder were mixed well with stirring in methanol, filtered, dried, 0.2% of Ionol (a stabilizer; 2,6-di-5-butyl-p-cresol) was added and the mixture was shaped into the form of pellets. The pellets were melt spun at 230° C. The obtained filaments were dyed red and violet well by dispersion dyestuffs of Daranol Red X3 and Estol Fast Violet B respectively.

The obtained particles of said reactive copolymer were heated to 80° C., in a 30% dioxane solution of ethylene diamine, washed with methanol and dried. As a result, finely divided polymeric particles containing 6.7% of nitrogen were obtained. Said particles were mixed with polypropylene same as mentioned above, the mixture was spun and dyed, and a good dyeing result was obtained as compared with filaments not having been treated with ethylene diamine. Also dyeability of this polypropylene fiber (filaments) with Wool Blue was improved.

Control 1

This example shows comparison of the composition of this invention and a known composition added with a cation exchange resin.

In order to sufficiently smash commercially available polymerization-type sulfonic acid type cation exchange resin and polymerization-type carboxylic acid-type cation exchange resin, after drying the two, they were shaken for 10 hours and smashed in a stainless ball mill. According to measuring by an electron microscope, the smashed resins were amorphous and their particle size were, the sulfonic acid-type was 0.1–1 micron and carboxylic acid-type was 0.1–2 micron.

These particles were washed with ether, respectively. Thereafter, same as in Example 1 these particles were mixed with polypropylene, being extruded in the form of pellets. At this occasion it was recognized that many foams were included in the pellets, at the same time, the transparency of the polymer composition was damaged; moreover, what had been blended with the sulfonic acid-type ion exchange resin discolored to yellowish brown. Next, these pellets were shaped into dumbell forms and tensile test thereof was carried out. In this case, the foams in the pellets were removed as much as possible.

The results of comparative test of these compositions were as shown in Table 1 below.

TABLE 1

| | Adding amount, percent | Yield strength, kg./cm.$^2$ | Elongation, percent |
|---|---|---|---|
| Added resin: | | | |
| Sulfonic acid-type | 5 | 230 | 28 |
| Carboxylic acid-type | 5 | 225 | 50 |
| Polypropylene only | | 290 | 750 |

Further, when these samples were dyed in a hot acetone solution of Celliton Blue Extra and dyed, what had been blended with the carboxylic acid-type resin was dyed at a glance, but easily decolored by extraction with acetone; however, what had been blended with the sulfonic acid-type resin and what had been according to this invention did not decolor by extraction with acetone. However, what had been blended with the sulfonic acid-type resin was observed to be remarkably inferior to clearness of the color of the dyed matter.

From the foregoing result, it is understood that a polypropylene composition mixed with a smashed cation exchange resin is low in thermal stability, pyrolyzing upon shaping, the moisture and a decomposed gas being accompanied into the composition together with the resin, causing occurrence of foams and lowering of transparency and physical properties of the shaped article, and the obtained dyed matter is either low in dyeing fastness or lacking clearness of the color.

EXAMPLE II

When polypropylene filaments obtained by spinning according to Example 1 were heated to 80° C., for 2 hours in a dioxane solution of Estrol Fast Orange GRUF to effect dyeing subsequently these dyed filaments were immersed in an aqueous solution of soap and heated for 1 hour on the water bath, clearly dyed filaments were obtained. When these filaments were refluxed and extracted by acetone, it was recognized that flowing out of the dyestuff was very slight and the fastness was excellent.

On the contrary, for the purpose of comparison when the similar experiment was conducted using polypropylene mixed with finely divided polymeric particles (0.1–0.5 micron) obtained by dissolving 24 grams of styrene, 3 grams of divinyl benzene and 0.2 gram of benzoyl peroxide in 100 cc. of kerosene and heated to 70–75° C. for 5 hours with stirring, by acetone extraction the dyestuff was completely extracted.

EXAMPLE III

This example is presented to illustrate the improvement of the dyeability of a variety of polymers by the inclusion of the crosslinked co-polymers containing a malic anhydride unit of the present invention.

A crosslinked co-polymer is obtained by polymerizing 40 grams of maleic anhydride with 16.8 grams of divinyl benzene using benzoyl peroxide catalyst at a temperature of 75–80° C., with stirring in 500 cc. of kerosene. Such polymerization yields approximately 27 grams of finely divided polymeric particles having a particle size of less than 1 micron.

Five parts of such particles with 95 parts of the below identified polymer powders are mixed well and cast to produce films. The films are dyed Estrol Fast Orange GRUF with good dyeabilities being shown. When these dyed films are extracted with a 1:3 solution of acetone and methanol by using a Soxhlet extractor, only slight discoloration of the dyed fiber is recognized. The distinction to this, when the spheroidal particles of crosslinked polymer in finely divided form are not added to the difficultly or hardly dyeable particles below, the polymeric films do not show a good dye result, and the dyestuff thereof is almost completely extracted by the mixed solution.

The polymers employed in this test are listed below.

(a) polystyrene
(b) polyethyleneterephthalate
(c) polyacrylonitrile
(d) polyvinyl chloride
(e) acrylonitrile-styrene co-polymer
(f) polymethylmethacrylate Again, the films containing the crosslinked polymeric spheroidal particles containing a maleic anhydride unit in accordance with the present invention show good dyeing, and a much lessened tendency for the dyestuff to be extracted by solvents.

EXAMPLE IV

When Example 1 is repeated except that an equivalent amount of phenylene diamine is employed in lieu of ethylene diamine to obtain a reactive co-polymer modified with an amino group substantially identical results with respect to improved dyeability are obtained.

While the present invention has been described primarily with respect to the foregoing specific examples, it is to be understood that the present invention is in no way to be deemed as limited thereto, but must be construed as broadly as all or any equivalents thereof.

What is claimed is:

1. A polymeric composition of improved dyeability comprising a difficultly dyeable polymer selected from polyolefins, polystyrene, polyesters, polyacrylonitrile, polyvinyl chloride, and copolymers thereof containing from 0.01% to 30% by weight of spheroidal particles of a particle diameter below one micron of a crosslinked copolymer of (1) maleic anhydride and (2) based on the weight of (1) from 0.5% to 30% by weight of a diethylenically unsaturated vinyl monomer having no other functional group.

2. The polymeric composition of claim 1 wherein said crosslinked copolymer may additionally contain (3) an ethylenically unsaturated vinyl monomer having no other functional groups.

3. A composition of claim 1 wherein the difficultly dyeable polymer is a polyolefin.

4. A composition of claim 1 wherein said difficultly dyeable polymer is polyethylene terephthalate.

5. A composition of claim 1 wherein said difficultly dyeable polymer is polyacrylonitrile.

6. A composition of claim 1 wherein said difficultly dyeable polymer is polyvinyl chloride.

7. The composition of claim 1 wherein said diethylenically unsaturated vinyl monomer having no other functional group is divinylbenzene.

8. The composition of claim 1 wherein said cross-linked co-polymer is modified by reaction with an amino compound.

9. The compositions of claim 1 wherein said spheroidal particles of said cross-linked copolymer are directly prepared by the free-radical polymerization of the monomers in an organic solvent which dissolves the monomers but does not dissolve the polymer formed.

10. The compositions of claim 7 wherein said spheroidal particles of said cross-linked copolymer are directly prepared by the free-radical polymerization of the monomers in an organic solvent which dissolves the monomers but does not dissolve the polymer formed.

References Cited

UNITED STATES PATENTS

| | | | |
|---|---|---|---|
| 3,423,481 | 1/1969 | Mizutani | 260—836 |
| 3,320,226 | 5/1967 | Cappuccio et al. | 260—93.7 |
| 3,290,411 | 12/1966 | Tsuji et al. | 260—873 |
| 3,127,234 | 3/1964 | O'Neill | 8—115.5 |

FOREIGN PATENTS

| | | | |
|---|---|---|---|
| 797,192 | 6/1958 | Great Britain | 260—2.2 |
| 18,264 | 1962 | Japan. | |

MURRAY TILLMAN, Primary Examiner

C. J. SECCURO, Assistant Examiner

U.S. Cl. X.R.

260—2.1, 2.2, 23, 23.7, 874, 896, 897, 898, 899